(12) United States Patent
Sågström (10) Patent No.: US 8,961,075 B2
(45) Date of Patent: Feb. 24, 2015

(54) MILLING TOOL AS WELL AS SET OF MILLING INSERTS OF A MILLING TOOL

(71) Applicant: Sandvik Intellectual Property AB, Sandviken (SE)

(72) Inventor: Thomas Sågström, Sandviken (SE)

(73) Assignee: Sandvik Intellectual Property AS, Sandviken (SE)

( * ) Notice: Subject to any disclaimer, the term of this patent is extended or adjusted under 35 U.S.C. 154(b) by 163 days.

(21) Appl. No.: 13/872,273

(22) Filed: Apr. 29, 2013

(65) Prior Publication Data

US 2013/0294851 A1 Nov. 7, 2013

(30) Foreign Application Priority Data

May 4, 2012 (SE) ...................................... 1250448

(51) Int. Cl.
```
B23C 5/08     (2006.01)
B23F 21/12    (2006.01)
B23C 5/20     (2006.01)
B23C 5/22     (2006.01)
B23F 21/14    (2006.01)
B23C 3/00     (2006.01)
```

(52) U.S. Cl.
CPC ................ *B23C 5/08* (2013.01); *B23F 21/128* (2013.01); *B23C 5/207* (2013.01); *B23C 5/2273* (2013.01); *B23C 5/205* (2013.01); *B23C 5/22* (2013.01); *B23F 21/146* (2013.01); *B23C 2200/0416* (2013.01); *B23C 2200/0494* (2013.01); *B23C 2200/165* (2013.01); *B23C 2200/367* (2013.01); *B23C 2210/168* (2013.01)
USPC .................... 407/40; 407/30; 407/44; 407/37

(58) Field of Classification Search
USPC ............ 407/30, 35, 40, 37, 36, 56, 67, 66, 73
See application file for complete search history.

(56) References Cited

U.S. PATENT DOCUMENTS

| | | | | |
|---|---|---|---|---|
| 3,729,808 A | * | 5/1973 | Wolf et al. | 407/44 |
| 4,363,576 A | * | 12/1982 | Zweekly | 407/50 |
| 4,738,570 A | * | 4/1988 | Wertheimer | 407/50 |
| 5,761,981 A | * | 6/1998 | Stoffels | 83/840 |
| 6,116,823 A | * | 9/2000 | Mihic | 407/40 |
| 7,121,769 B2 | * | 10/2006 | Satran et al. | 407/40 |

* cited by examiner

*Primary Examiner* — Will Fridie, Jr.
(74) *Attorney, Agent, or Firm* — Corinne Gorski (57) ABSTRACT

A milling tool for slot milling includes a tool body and a plurality of separated first seats, which form root insert seats for root inserts arranged one after the other along a first line and a plurality of separated flank insert seats that includes a plurality of second seats for flank inserts . The plurality of second seats is arranged one after the other along a second line on a primary side of the root insert seats. A plurality of third seats for flank inserts is arranged one after the other along a third line on a secondary side of the root insert seats. Each flank insert seat includes a bottom surface, an inner side surface, and an outer side surface. Each flank insert includes an under side, an opposite upper side, and a circumferential edge side that forms a rake face connecting the upper side and the underside.

18 Claims, 7 Drawing Sheets

MILLING TOOL AS WELL AS SET OF MILLING INSERTS OF A MILLING TOOL

RELATED APPLICATION DATA

This application claims priority under 35 U.S.C. §119 to Swedish Patent Application No. 1250448-6, filed on May 4, 2012, which the entirety thereof is incorporated herein by reference.

FIELD OF THE INVENTION AND PRIOR ART

The present invention concerns a milling tool for slot milling. The milling tool may be formed as a so-called slot cutter or slitting cutter for the milling of straight or oblique slots, particularly for the manufacture of splines, but the milling tool can also be utilized for the manufacture of gearwheels. More precisely, the invention concerns a milling tool according to the preamble of claim 1 and a set of milling inserts according to the preamble of claim 16.

The brochure *Gear Production Tools* from Kennametal, p. 21, 2009, shows a milling tool of the type indicated by way of introduction. This known milling tool is formed for the milling of sprocket wheels. The milling tool comprises a tool body defining a rotation axis, a plurality of first seats, which are separated in a circumferential direction, form root insert seats, and are arranged one after the other in the tool body along a first line that extends around the rotation axis, and a plurality of flank insert seats separated in the circumferential direction, the flank insert seats comprising a plurality of second seats, which are arranged one after the other along a second line that extends around the rotation axis on a primary side of the root insert seats, and a plurality of third seats, which are arranged one after the other along a third line that extends around the rotation axis on a secondary side of the root insert seats. Each flank insert seat comprises a bottom surface, an inner side surface, and an outer side surface. Each root insert seat comprises a replaceable radially mounted root insert. Each flank insert seat comprises a replaceable radially mounted flank insert.

Furthermore, each root insert of this known milling tool comprises an under side, an opposite upper side forming a rake face, a circumferential edge side connecting the upper side and the under side, and at least one primary main cutting edge and a secondary main cutting edge, which converge toward each other and are formed where the edge side meets the upper side. Each flank insert comprises an under side, an opposite upper side, and a circumferential edge side connecting the upper side and the under side, and each flank insert defining a centre axis that extends through the upper side and under side of the flank insert. The upper side of the flank insert forms the rake face and the edge side forms a clearance surface.

Radially mounted flank inserts of the type shown in Gear Production Tools have the disadvantage that they require a large space in the tool body. This applies particularly to large milling tools. Thereby, the tool body weakens and large stresses arise.

Another problem is the difficulty to create space for a proper treatment of the chips formed. It is furthermore difficult to manufacture the seat for this radial flank insert, particularly for the achievement of a correct axial position of the cutting edge.

The brochure *Gear Production Tools* also shows examples of tangentially mounted root inserts, see, for instance, p. 14. Such root inserts have the disadvantage that lateral forces act from different directions for consecutive root inserts. Thereby, the lateral forces will alternately change the direction and thereby generate an imbalance of the milling tool. This, in turn, generates a poor surface of the workpiece and a high sound level. A further disadvantage of such tangentially mounted root inserts is that the cutting edges of the different milling inserts have to overlap each other and thereby there is a risk of groove formation in the workpiece.

SUMMARY OF THE INVENTION

The object of the invention is to obviate the above-mentioned problems. The invention aims at a milling tool for slot cutting, which has a high strength of the tool body and guarantees a good surface of the machined workpiece.

This object is achieved by the initially indicated milling tool that is characterized in that the edge side of the flank insert forms a rake face.

In a milling tool according to the invention, the root inserts, which machine the root or bottom area of a slot, for instance between two adjacent teeth, of the workpiece, are radially mounted. The flank inserts that machine the outer flanks of the slots, for instance of two adjacent teeth, of the workpiece, are on the other hand tangentially mounted. The expressions "radially" and "tangentially" mounted are recognized definitions within the technical field of this invention and indicate to a person skilled in the art how the milling inserts are situated in the tool body. In a radially mounted milling insert, the rake face extends from a rear edge of the milling insert radially, or approximately radially, outward toward the cutting edge. In a tangentially mounted milling insert, the rake face extends from a rear edge of the milling insert tangentially, or approximately tangentially, outward toward the cutting edge. These expressions do not mean that the milling inserts extend exactly radially and tangentially, respectively, in relation to the rotation axis of the tool.

By this tangential mounting of the flank inserts, the extension of the flank inserts in the axial direction in respect of the rotation axis of the tool will be relatively short, and its extension in the radial, and preferably also in the tangential, direction will be relatively long. The space that is required for the flank insert in the tool body in the axial direction will, therefore, be relatively short in comparison with a radially mounted flank insert, see above mentioned *Gear Production Tools*, which contributes to a high strength of the tool body. This also means that the active cutting edge of the flank inserts that is in engagement with the workpiece can be made relatively long, which contributes to a high surface smoothness of the machined surface of the workpiece.

In the radially mounted root inserts, the primary main cutting edges and the secondary main cutting edges will machine a respective side of the slot in the workpiece. By the radial mounting of the root inserts, the primary main cutting edge and secondary main cutting edge of the root insert will also simultaneously be in engagement with the workpiece. In such a manner, it is guaranteed that the cutting forces are uniformly distributed between the primary and secondary main cutting edges and no uneven or varying load arises. Thus, the machining can be made without, or with small, vibrations, and at a low sound level.

According to one embodiment of the invention, the edge side comprises a plurality of edge side sections that form a respective rake face and a respective flank insert edge together with the upper side and possibly a respective rake face and a respective flank insert edge together with the under side. Advantageously, the edge side may comprise two or four edge side sections, each one of which forms one or two flank insert edges. Such a flank insert is indexable into two or four positions by the flank insert being rotated on the centre axis. By indexing around an axis that is perpendicular to the centre, there are eight positions and accordingly eight flank insert edges available.

According to a further embodiment of the invention, the distance between the upper side and the under side of each flank insert is essentially shorter than the shortest length of the upper side of the flank insert along a direction that intersects the centre axis, i.e., along any direction that is parallel to the upper side. Advantageously, the distance between the upper side and the under side may be constant, or essentially constant, along the entire edge side. However, it is also possible to allow the distance between the upper side and the under side be equally long or longer than the shortest length of the upper side of the flank insert along a direction that intersects the centre axis, for instance a first direction that extends from the flank insert edge. The length along a second direction that extends perpendicular to the first direction may, however, be longer than the distance between the upper side and the under side.

According to a further embodiment of the invention, each flank insert has a fastening hole that extends through the upper side and the under side. Advantageously, each flank insert may then be attached in its respective flank insert seat by means of a fixing screw that extends through the fastening hole into the tool body and that presses the flank insert against the flank insert seat by a press force. Such a fixing screw allows fastening of the flank insert in a reliable way by a relatively large press force. Thanks to the under side of the flank insert being pressed against the bottom surface of the flank insert seat, the axial position of the flank insert, and thereby of the active flank insert edge, can be guaranteed with high accuracy.

According to a further embodiment of the invention, the fixing screw extends in an attachment direction having an axial component that is considerably greater than other direction components of the attachment direction. Furthermore, each flank insert seat may have a bottom surface, an outer side surface, and an inner side surface. Advantageously, the fixing screw may then press the under side of the flank insert against the bottom surface by a principal force component of said press force and one of the edge side sections against the outer side surface by a first smaller force component of said press force.

According to a further embodiment of the invention, the fixing screw also presses another edge side section of the flank insert against the inner side surface by a second smaller force component of said press force. Advantageously, the second smaller force component may be smaller than the first smaller force component. However, it should be noted that the first smaller force component and the second smaller force component may be equally, or essentially equally large. Independently of this, it is, however, advantageous that the flank insert is pressed against three surfaces, which contributes to a very high accuracy of the position of the flank insert.

According to a further embodiment of the invention, the primary main cutting edge of the root insert and the flank insert edge of the flank insert in said second seat extend in a projection along a respective common line, which comprise sections intersecting or overlapping each other. In the same way, the secondary main cutting edge of the root insert and the flank insert edge of the flank insert in said third seat extend in a projection along a respective common line, which comprise sections intersecting or overlapping each other.

According to a further embodiment of the invention, the root inserts and the different flank inserts are arranged in an alternating order in respect of the circumferential direction. For instance, a root insert may be followed by two flank inserts, one on each side of the root insert, and then said sequence is repeated around the entire milling tool. It is also possible to allow every second milling insert be a root insert and every second milling insert a flank insert. Also other alternating orders are possible.

According to a further embodiment of the invention, the rake face of the root insert extends in an extension plane comprising the primary main cutting edge and the secondary main cutting edge, and the extension plane of each root insert having a normal that is parallel to a tangent of the first line where the same intersects the extension plane. Such a positioning of the root inserts is highly advantageous in respect of the cutting machining and the tolerance level aimed at for the slots to be milled.

According to a further embodiment of the invention, each root insert comprises a symmetry line that is perpendicular to a tangent of the first line, and the primary main cutting edge and the secondary main cutting edge being symmetrical in respect of the symmetry line. The symmetry line forms an angle $\beta$ with each one of the primary main cutting edge and the secondary main cutting edge. Particularly in gear milling, the angle $\beta$ may be in the interval of 18-32°, for instance, the angle $\beta$ may be 20° or 30°.

The object is also achieved by the initially indicated set of milling inserts of a milling tool for slot milling, which is characterized in that the edge side of the flank insert forms a rake face. Such a set is advantageous for milling tools for slot milling. By these milling inserts, the milling tool can be utilized in the way described above and contribute to the above-mentioned technical advantages. The number of root inserts and the number of flank inserts of the set may vary and be adapted to the milling tool for which the set is formed.

According to a further embodiment of the invention, each root insert comprises a transverse end cutting edge that extends between the primary main cutting edge and the secondary main cutting edge. The end cutting edge may be straight or comprise a straight section having transitions edges with a small radius of curvature to the primary main cutting edge and the secondary main cutting edge, respectively.

According to a further embodiment of the invention, the rake face of the root insert extends in an extension plane comprising the primary main cutting edge and the secondary main cutting edge, a normal to the extension plane forming an acute clearance angle with the edge side at least in the vicinity of said cutting edges of the root insert so that the root insert obtains a positive cutting geometry.

BRIEF DESCRIPTION OF THE DRAWINGS

The present invention will now be explained in more detail by a description of different embodiments and reference being made to the appended drawings.

DETAILED DESCRIPTION OF DIFFERENT EMBODIMENTS

Figure 1:
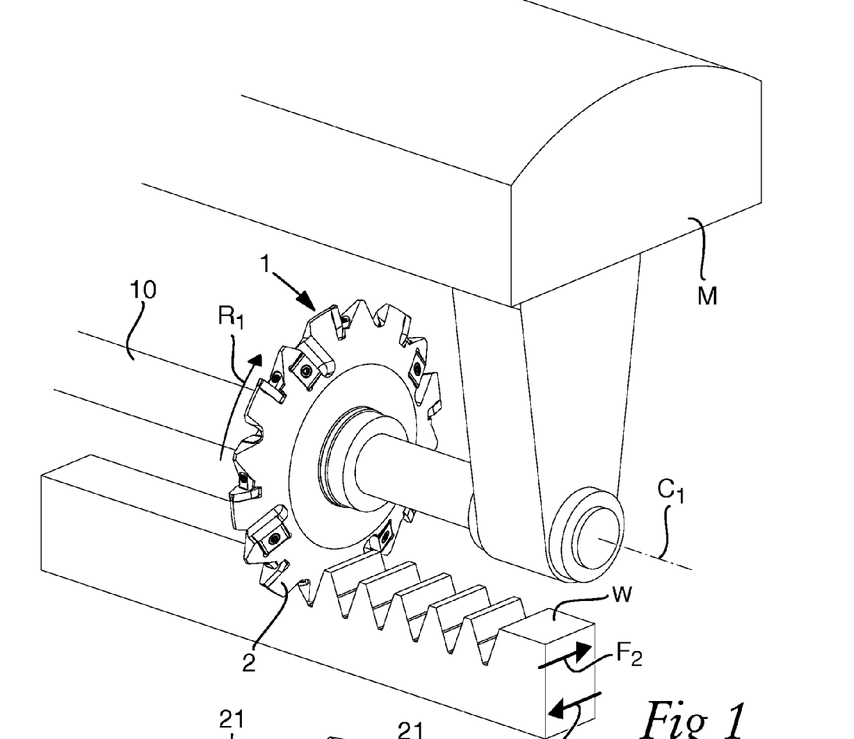
FIG. 1 shows a perspective view of a part of a machine tool for slot milling.
Figure 2:
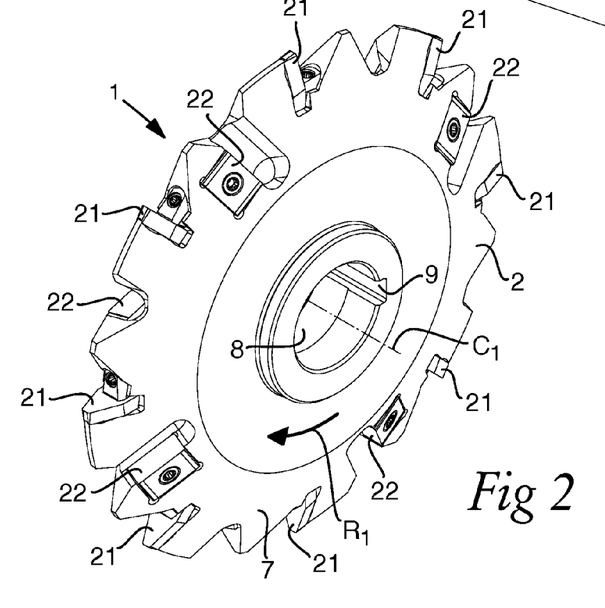
FIG. 2 shows a perspective view of a milling tool, for instance, for the machine tool in FIG. 1.
Figure 3:
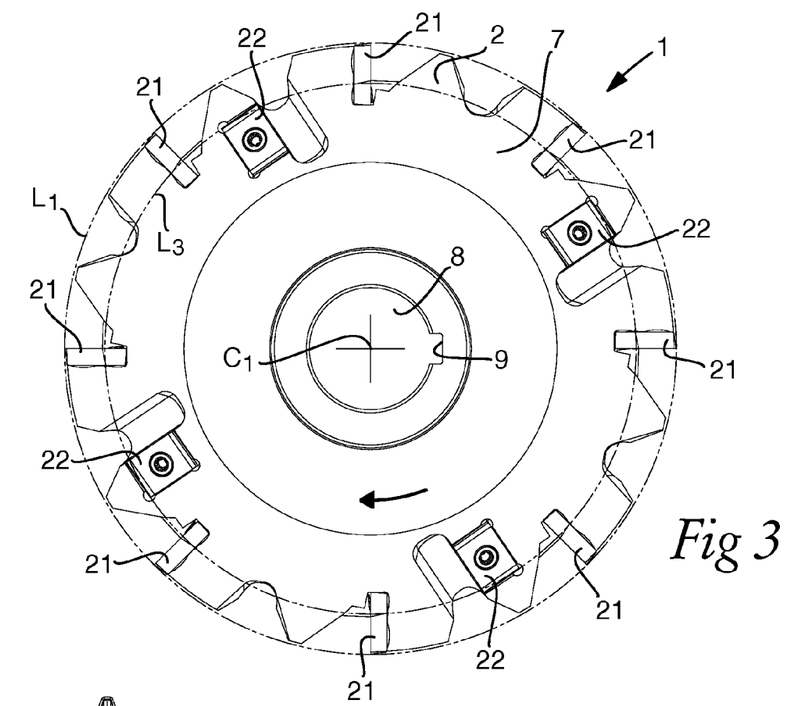
FIG. 3 shows a planar view of the milling tool in FIG. 2.
Figure 4:
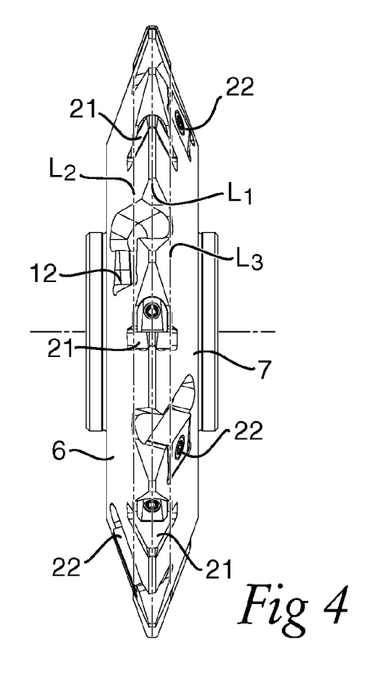
FIG. 4 shows a front view of the milling tool in FIG. 2.

FIG. 1 shows schematically a machine tool M having a milling tool 1 that is formed for the cutting machining and more precisely for the slot milling of a workpiece W. The milling tool 1 is suitable for the cutting machining of a number of different workpieces W wherein one or more slots is desired, for instance splines, gearwheels, racks, etc.

A first embodiment of the milling tool 1 is shown in more detail in FIGS. 2-8. The milling tool 1 comprises a tool body 2, which may be manufactured from steel, and a large number of replaceable milling inserts 21, 22, which may be manufactured from a material that is harder than steel, for instance, cemented carbide. The tool body 2 defines a rotation axis $C_1$ and has a primary side 6 and an opposite secondary side 7. The rotation axis $C_1$ extends through the primary side 6 and the secondary side 7.

The milling tool 1 also comprises a through axial hole 8 having a straight groove 9 for the receipt of a rod or drive shaft 10, for instance in accordance with DIN 138. The rod 10 is formed for the attachment of the milling tool 1 in a tool spindle of the machine tool M, which may be a milling cutter or a multi operation machine. The tool body 2 is rotatable on the rotation axis $C_1$ in a direction of rotation $R_1$. The workpiece W is fixed in a suitable way, stationary or movably. The workpiece W may be displaceable in relation to the milling tool 1 along a feeding direction $F_1$ for the down-milling and in a feeding direction $F_2$ for the up-milling. Naturally, the feeding motion may instead be provided by the displacement of the milling tool 1 with the workpiece W at rest.

The tool body 1 comprises a plurality of first seats 11 separated in a circumferential direction, a plurality of second seats 12 separated in the circumferential direction, and a plurality of third seats 13 separated in the circumferential direction. The first seats 11 form root insert seats, and are arranged one after the other in the tool body 1 along a first line $L_1$, see FIGS. 4 and 8, that extends around the rotation axis $C_1$. The second seats 12, see FIG. 4, form flank insert seats, which are arranged one after the other along a second line $L_2$ that extends around the rotation axis $C_1$ on the primary side 6. The third seats 13, see FIG. 6, form flank insert seats, which are arranged one after the other along a third line $L_3$ that extends around the rotation axis $C_1$ on the secondary side 7.

Figures 6, 7:
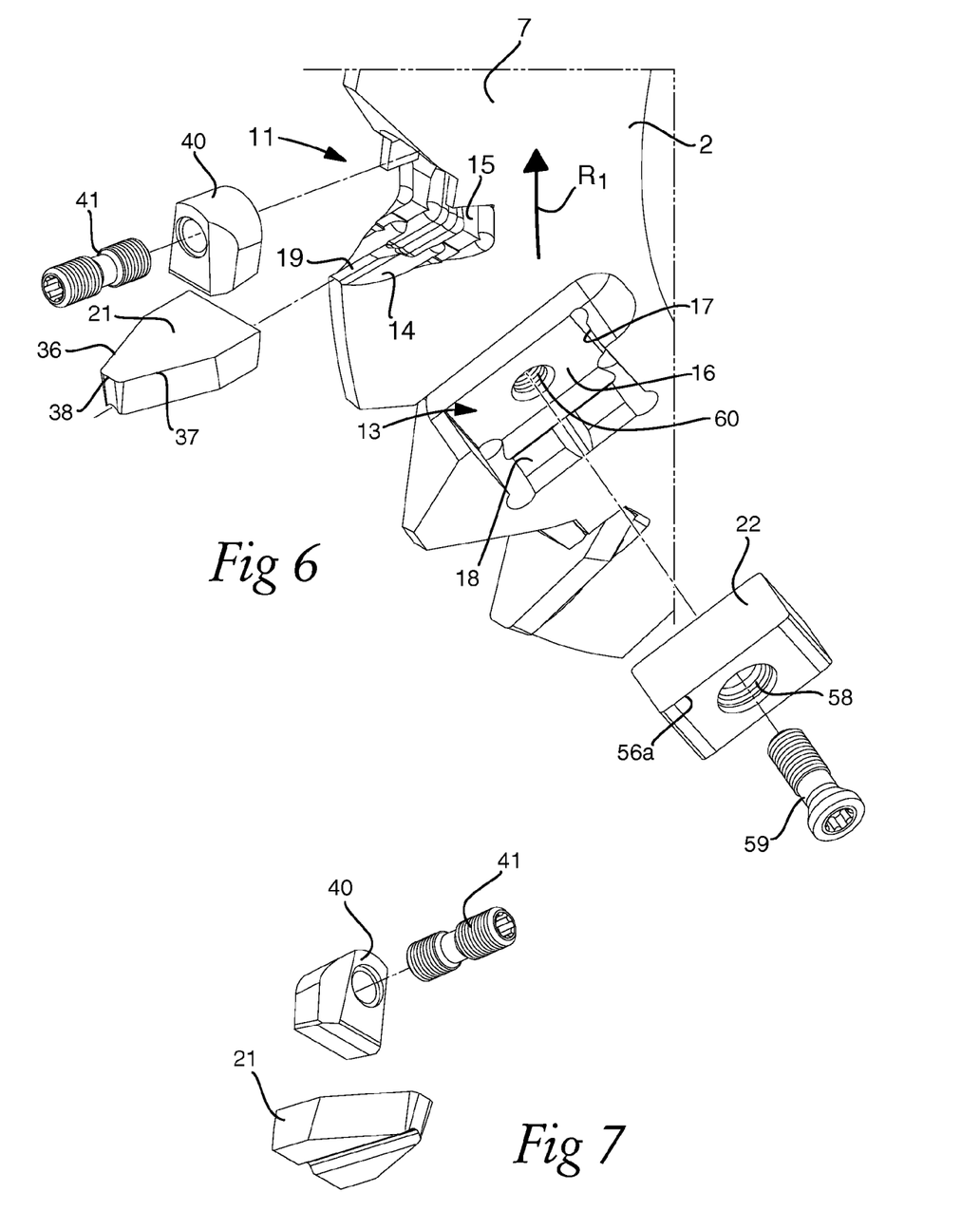
FIG. 6 shows an exploded view in perspective of a part of the milling tool in FIG. 2.
FIG. 7 shows an exploded view in perspective of a root insert having a clamping wedge of the milling tool in FIG. 2.
Figure 8:
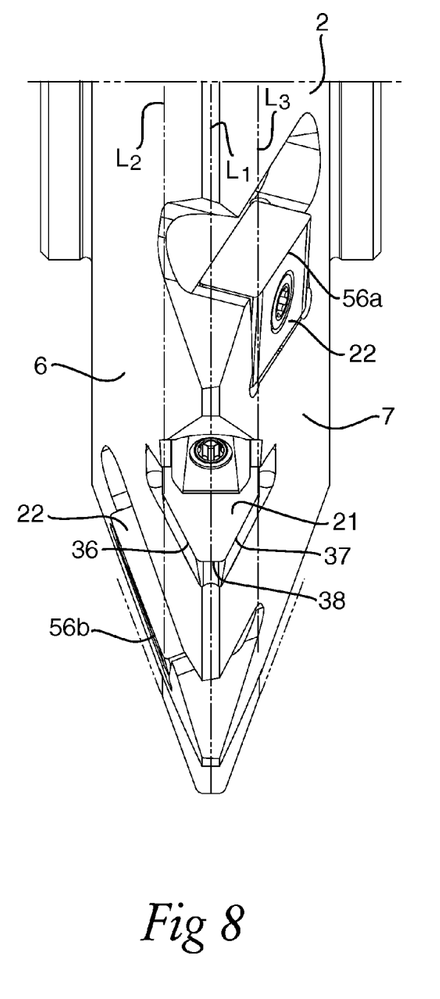
FIG. 8 shows a front view of a part of the milling tool in FIG. 2.

Each first seat 11 comprises a bottom surface 14 and an inner support surface 15, see FIG. 6. The second seats 12 and the third seats 13 are identical but symmetrically arranged on each side of the first seats 11, i.e., of the root insert seats. Each flank insert seat, i.e., each second seat 12 and third seat 13, comprises a bottom surface 16, an inner side surface 17, and an outer side surface 18, see FIG. 6.

Each first seat 11 comprises a replaceable root insert 21 and each flank insert seat, i.e., each second seat 12 and each third seat 13, comprises a replaceable flank insert 22. The flank inserts 22 for the second seats 12 and for the third seats 13 may advantageously, but do not necessarily have to, be identical.

The bottom surface 14 of each first seat 11 comprises an elevation, preferably having the shape of a radial elongate ridge 19, which extends from the bottom surface 14 and outward, particularly in a radial or essentially radial direction, see FIG. 6. The elongate ridge 19 has two leaning flank surfaces that extend between the bottom surface 14 and an upper surface of the elongate ridge 19. The two flank surfaces form an obtuse angle with each other. This angle may be 90-140°, for instance 120°. The upper surface may be plane and parallel to the bottom surface 14.

Each root insert 21, see FIGS. 10-16, comprises an under side 31, an opposite upper side 32 forming a rake face, and a circumferential edge side 33 connecting the upper side 32 and the under side 31. The under side 31 of each root insert 21 comprises a recess having the shape of an elongate valley 34. The elongate valley 34 has two leaning flank surfaces that extend between the under side 31 of the root insert 21 and a bottom surface that may be plane and parallel to the under side 31. Furthermore, each root insert 21 forms or comprises a primary main cutting edge 36, a secondary main cutting edge 37, and a transverse end cutting edge 38 that extends between the primary main cutting edge 36 and the secondary main cutting edge 37. The cutting edges 36, 37, and 38 are formed where the edge side 33 meets the upper side 32.

The primary main cutting edge 36 and the secondary main cutting edge 37 converge toward each other. The rake face of the root insert 21 extends in an extension plane $P_1$, which, in the embodiments shown, comprises or is parallel to the primary main cutting edge 36 and the secondary main cutting edge 37. Each root insert 21 comprises furthermore a symmetry line S that is perpendicular to a tangent of the first line $L_1$. The elongate valley 34 also extends parallel to the symmetry line S. The primary main cutting edge 36 and the secondary main cutting edge 37 are symmetrical in respect of the symmetry line S. The end cutting edge 38 may, but does not necessarily have to, be perpendicular to the symmetry line S. In the embodiments shown, the edge side 33 also forms a rear side 39 that extends perpendicular to the symmetry line and parallel to the end cutting edge 38.

A normal to the extension plane $P_1$ forms an acute clearance angle α with the edge side 33 at least in the vicinity of or along the primary main cutting edge 36 and the secondary main cutting edge 37 so that the root insert 21 obtains a positive cutting geometry. Advantageously, an acute clearance angle α is formed with the edge side 33 also along the end cutting edge 38 so that the root insert 21 obtains a positive cutting geometry also in respect of the end cutting edge 38. However, it should be noted that the end cutting edge 38 at least in certain applications is not in cutting machining with the workpiece W. It should also be noted that the clearance angle α along the end cutting edge 38 may have another size than the clearance angle α along the primary main cutting edge 36 and the secondary main cutting edge 37.

Each root insert 21 is arranged in a first seat 11 in such a way that the under side 31 abuts against the bottom surface 14. When the root insert 21 is mounted in the first seat 11, the elongate ridge 19 is in engagement with the elongate valley 34 of the under side 31 of the root insert 21 in such a way that the axial position of the root insert 21 in respect of the rotation axis $C_1$ is guaranteed. When the root insert 21 is mounted in the first seat 11, the flank surfaces of the elongate ridge 19 will abut against one each of the flank surfaces of the elongate valley 34. Advantageously, there may be a gap between the upper surface of the ridge 19 and the bottom surface of the valley 34. Furthermore, the rear side 39 of the root insert 21 abuts against the inner support surface 15 that guarantees the radial position of the root insert 21 in relation to the rotation axis $C_1$.

In the embodiments shown, each root insert 21 is secured in the respective first seat 11 by means of a wedge-shaped block 40 that abuts against the upper side 32 of the root insert 21 and presses the root insert 21 against the bottom surface 14 and against the inner support surface 15. The wedge-shaped block 40 is tightened against the root insert 21 by means of a double-threaded screw 41, see FIG. 6, that extends through and is in engagement with the wedge-shaped block 40 and a threaded hole (not shown) in the tool body 2. It should be noted that the root inserts 21 also may be secured in other ways, for instance by means of a fixing screw that extends through a hole in the root insert 21 and into the tool body 2.

Each flank insert 22, see FIGS. 17-20, comprises an under side 51, an opposite upper side 52, and a circumferential edge side 53 connecting the upper side 52 and the under side 51. The under side 51 and the upper side 52 define each an extension plane, which are parallel to each other. Each flank insert 22 defines a centre axis A that extends through the upper side 52 and under side 51 of the flank insert 22. The distance between the upper side 52 and the under side 51 of each flank insert 22 is, in the embodiments shown, essentially shorter than the shortest length of the upper side 52, or under side 51, of the flank insert 22 along any direction that intersects the centre axis A at a right angle. For instance, said distance may be maximally 85% of said shortest length of the upper side 52 of the flank insert 22, and more particularly maximally 85% of the smallest insert width.

The edge side 53 of the flank insert 22 forms a rake face and comprises four edge side sections. In the embodiments shown, the edge side 53 comprises two edge side sections 53a and 53b that form a respective rake face and a respective flank insert edge 55a, 55b together with the upper side 52. The above-mentioned insert width corresponds to the length of the flank insert edge 55a, 55b. In the embodiments shown, the flank insert 22 is accordingly indexable by rotation 180° on the centre axis A. In the embodiments shown, the flank insert 22 is in addition indexable by rotation 180° on an axis that is perpendicular to the centre axis A. By such an indexing, the two edge side sections 53a and 53b will form a respective flank insert edge 56a, 56b together with the under side 51.

In the embodiments shown, each flank insert 22 has accordingly four flank insert edges 55a, 55b, 56a, and 56b, which by indexing can form the active flank insert edge. Thus, in the embodiment illustrated, the edge side 53 comprises two edge side sections 53c and 53d that do not form any cutting edges with the upper side 52 and the under side 51. However, it should be noted that also said four edges may be formed as flank insert edges, the flank insert 22 obtaining a quadratic shape as seen in the direction of the centre axis A.

Each flank insert 22 has a fastening hole 58 that extends through the upper side 52 and the under side 51. Each flank insert 22 is attached and secured in its respective second or third seat 12, 13 by means of a fixing screw 59, see FIG. 6, that extends through the fastening hole 58 into a threaded hole 60 that extends through the bottom surface 16 into the tool body 2. By means of the fixing screw 59, the under side 51, or upper side 52, of the flank insert 22 is pressed against the bottom surface 16 of the seat 12, 13 by a press force.

The fixing screw 59 extends in an attachment direction having an axial component that is considerably greater than other direction components of the attachment direction. The fixing screw 59 presses the under side 51, or upper side 52, of the flank insert 22 against the bottom surface 16 by a principal force component of said press force. Simultaneously, one of the edge side sections 53a, 53b is pressed against the outer side surface 18 by a first smaller force component of said press force. Furthermore, the fixing screw 59 will also press one of the edge side sections 53c and 53d of the flank insert 22 against the inner surface 17 by a second smaller force component of said press force. Preferably, the second smaller force component is smaller than the first smaller force component.

In the embodiments shown in FIGS. 1-9, the first line $L_1$, as well as the second and third lines $L_2$ and $L_3$, extend parallel to each other and to a plane perpendicular to the rotation axis $C_1$. Furthermore, in the embodiments shown, the extension plane $P_1$ of each root insert 21 has a normal that is parallel to a tangent of the first line $L_1$ where the same intersects the extension plane $P_1$. However, it should be noted that it is possible to allow said normal lean in relation to said tangent.

Figure 5:
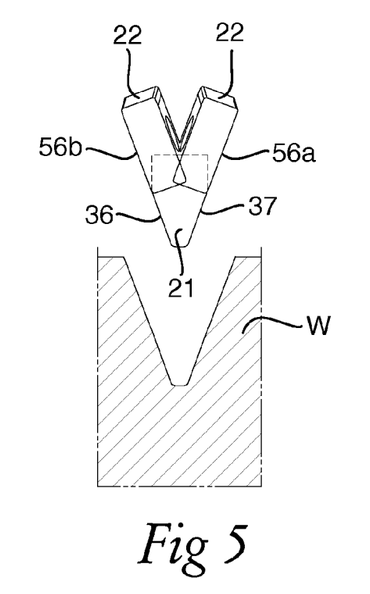
FIG. 5 shows a section view through a workpiece and three milling inserts of the milling tool in FIG. 2 in a projection.

In the embodiment shown in FIGS. 1-8, the primary main cutting edge 36 of the root insert 21 and the flank insert edge 56b of the flank insert 22 in said second seat 12 extend in a projection along a respective common line, which comprise sections overlapping each other and extending in a common direction, see FIG. 5. In the same way, the secondary main cutting edge 37 of the root insert 21 and the flank insert edge 56a of the flank insert 22 in said third seat 13 extend in a projection along a respective common line, which comprise sections overlapping each other and extending in a common direction, see FIG. 5.

Figure 9:
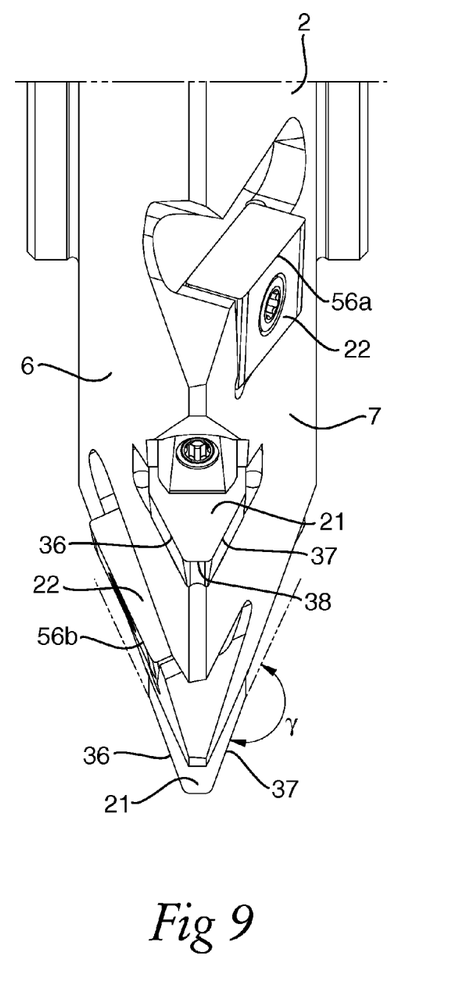
FIG. 9 shows a front view of a part of a modified milling tool for slot milling.
Figure 10:
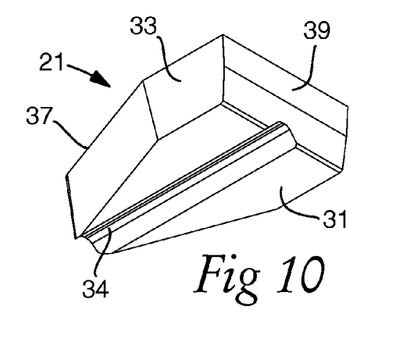
FIG. 10 shows a perspective view from below of a root insert of the milling tool in FIG. 2.
Figure 11:
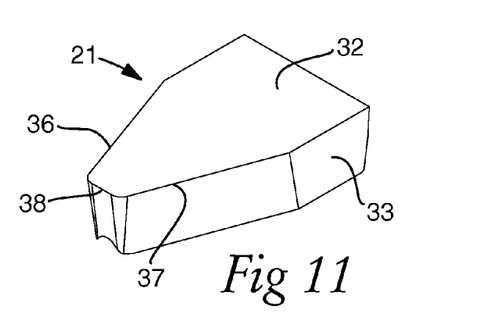
FIG. 11 shows a perspective view from above of the root insert in FIG. 10.
Figure 12:
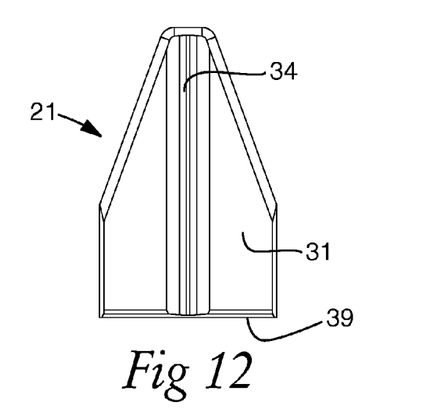
FIG. 12 shows a view from below of the root insert in FIG. 10.
Figure 13:
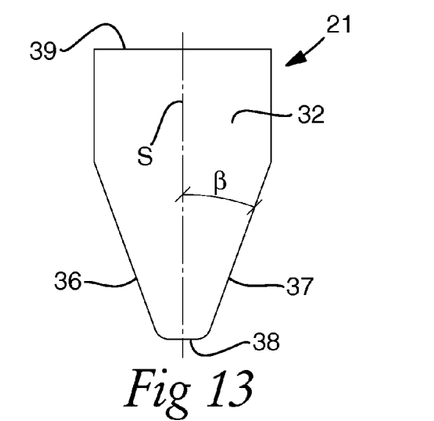
FIG. 13 shows a view from above of the root insert in FIG. 10.
Figure 14:
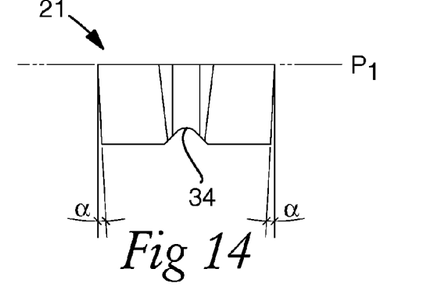
FIG. 14 shows a view from the front of the root insert in FIG. 10.
Figure 15:
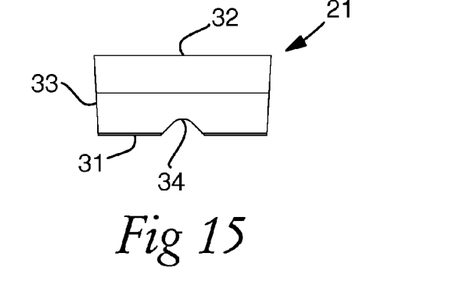
FIG. 15 shows a view from behind of the root insert in FIG. 10.
Figure 16:
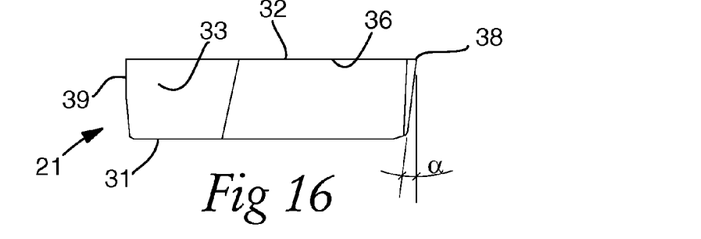
FIG. 16 shows a view from the side of the root insert in FIG. 10.
Figure 17:
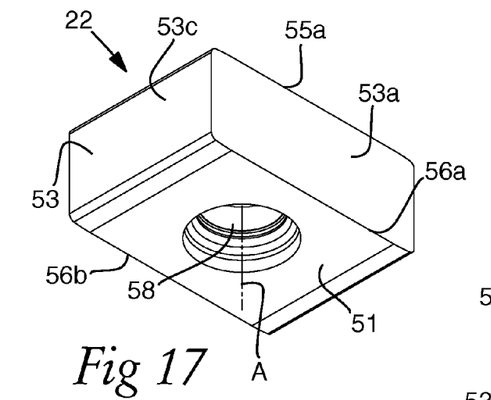
FIG. 17 shows a perspective view from below of a flank insert of the milling tool in FIG. 2.
Figure 18:
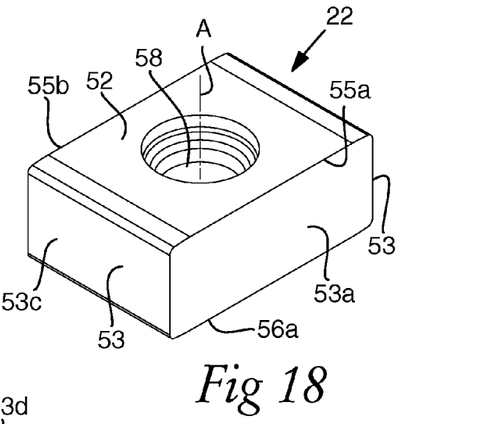
FIG. 18 shows a perspective view from above of the flank insert in FIG. 17.
Figure 19:
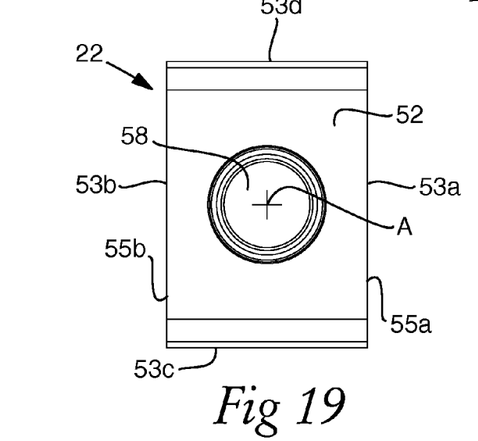
FIG. 19 shows a view from below of the flank insert in FIG. 17.
Figure 20:
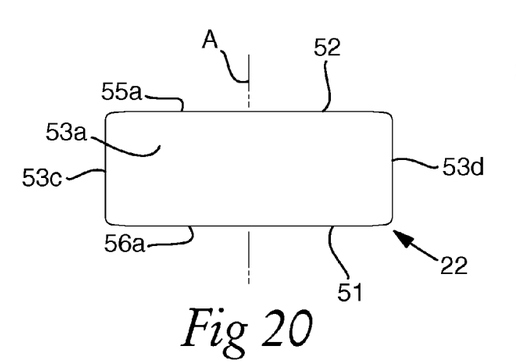
FIG. 20 shows a view from the side of the flank insert in FIG. 17.
Figure 21:
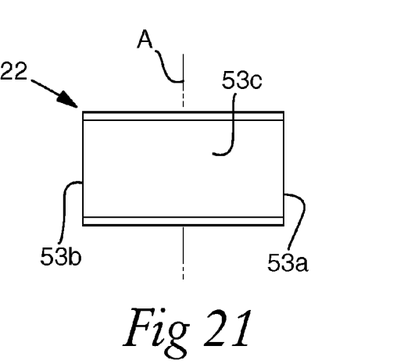
FIG. 21 shows a view from the front of the flank insert in FIG. 17.

In the embodiment shown in FIG. 9, the primary main cutting edge 36 of the root insert 21 and the flank insert edge 56b of the flank insert 22 in said second seat 12 extend in a projection along a respective common line, which comprise sections intersecting each other and forming an obtuse angle. In the same way, the secondary main cutting edge 37 of the root insert 21 and the flank insert edge 56a of the flank insert 22 in said third seat 13 extend in a projection along a respective common line, which comprise sections intersecting each other and forming an obtuse angle γ. In FIG. 9, the flank insert edge 56a of the flank insert 22 is projected next to the secondary main cutting edge 37 of the root insert 21.

In the embodiments shown in FIGS. 1-9, the lines $L_1$, $L_2$, and $L_3$ extend in an axial plane that is intersected by the rotation axis $C_1$ at a right angle. Such milling tools are particularly suitable for the milling of slots in splines and racks.

Figure 22:
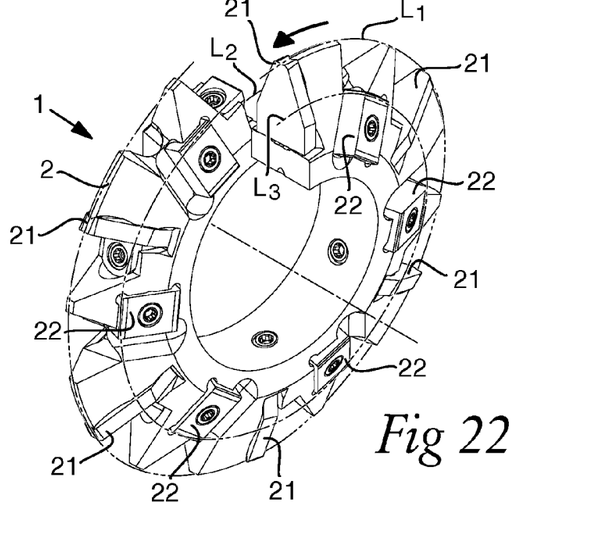
FIG. 22 shows a perspective view from below of a milling tool according to another embodiment.
Figure 23:
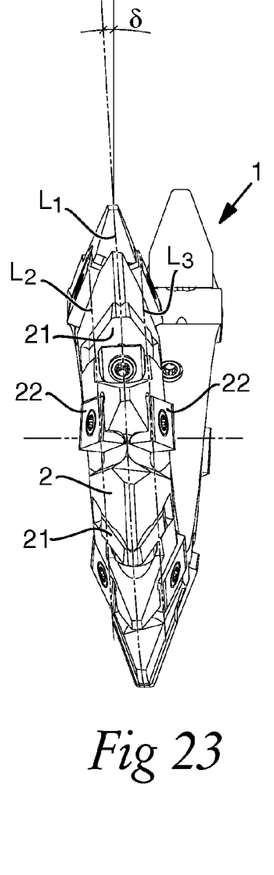
FIG. 23 shows a front view of the milling tool in FIG. 22.
Figure 24:
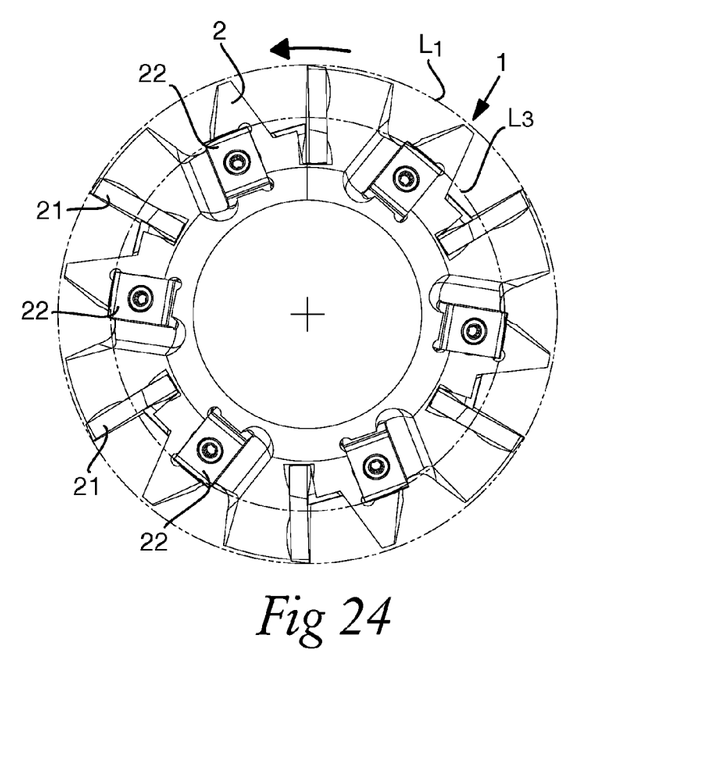
FIG. 24 shows a planar view of the milling tool in FIG. 22.

In FIGS. 22-24, another embodiment is illustrated wherein the lines $L_1$, $L_2$, and $L_3$ form an angle with the rotation axis $C_1$. More precisely, these lines form a helix line having constant pitch. The pitch angle δ may be 1-10°. Such a milling tool, which in other respects has the same design as the milling tool in FIGS. 1-9, is particularly suitable for gear cutting and may be a hob or a part of a hob. In this case, a plurality of milling tools 1 of the type shown in FIGS. 22-24 may be arranged beside each other and be fixed in relation to each other so that the lines $L_1$, $L_2$, and $L_3$ form a respective constant pitch line of the hob tool. In this embodiment, it is also advantageous that the rake face of the root insert 21 extends in an extension plane $P_1$ comprising the primary main cutting edge 36 and the secondary main cutting edge 37. With the purpose of obtaining a high accuracy of the teeth to be cut and particularly of the involute of the teeth, it is advantageous if the extension plane $P_1$ of each root insert 21 has a normal that is parallel to a tangent of the first line $L_1$ where this line intersects the extension plane $P_1$. Such a design may be advantageous also for the embodiments shown in FIGS. 1-9.

It should be noted that the root inserts 21 in the embodiments shown may be provided with chip-forming or chip-breaking means that extend above or underneath the extension plane $P_1$ and/or the main cutting edges 36,37 and the end cutting edge 38.

It should be noted that the root inserts 21 may comprise edge deflections of the primary and secondary main cutting edges 36, 37 in the vicinity of the end cutting edge 38 for the provision of so-called protuberance. Thus, these outer edge deflections form protuberance cutting edges that may extend in, or parallel to, the extension plane $P_1$. The same protuberance cutting edges allow a deeper or wider cutout in the vicinity of the bottom surface of the slot in the workpiece W.

The invention is not limited to the embodiments shown but may be varied and modified within the scope of the subsequent claims.

LIST OF REFERENCE SIGNS 1 milling tool
2 tool body
6 primary side
7 secondary side
8 axial hole
9 groove
10 rod
11 first seat
12 second seat
13 third seat
14 bottom surface
15 inner support surface
16 bottom surface
17 inner side surface
18 outer side surface
19 elongate ridge
21 root insert
22 flank insert
31 under side
32 upper side
33 edge side
34 elongate valley
36 primary main cutting edge
37 secondary main cutting edge
38 end cutting edge
39 rear side
40 wedge-shaped block
41 double-threaded screw
51 under side
52 upper side
53 edge side
53$a$-53$d$ edge side section
55$a$, 55$b$ flank insert edge
56$a$, 56$b$ flank insert edge
58 fastening hole
59 fixing screw
60 threaded hole
M machine tool
W workpiece
$C_1$ rotation axis
$R_1$ direction of rotation
$F_1$ feeding direction
$F_2$ feeding direction
$L_1$ first line
$L_2$ second line
$L_3$ third line
$P_1$ extension plane
α clearance angle
S symmetry line
A centre axis
δ pitch angle
β angle
γ projected angle

The invention claimed is:

1. A milling tool for slot milling, comprising:
a tool body defining a rotation axis; and
a plurality of first seats separated in a circumferential direction and forming a plurality of root insert seats, the plurality of root insert seats being arranged one after the other in the tool body along a first line that extends around the rotation axis;
a plurality of flank insert seats separated in the circumferential direction, the flank insert seats comprising a plurality of second seats arranged one after the other along a second line that extends around the rotation axis on a primary side of the root insert seats, and a plurality of third seats arranged one after the other along a third line that extends around the rotation axis on a secondary side of the root insert seats, each of said plurality of flank insert seats including a bottom surface, an inner side surface, and an outer side surface, wherein each of the plurality of root insert seats comprises a replaceable root insert and each of the plurality of flank insert seats comprises a replaceable flank insert each root insert including an under side, an opposite upper side forming a rake face, a circumferential edge side connecting the upper side and the underside, and at least one primary main cutting edge and a secondary main cutting edge, which converge toward each other and are formed where the edge side meets the upper side, each flank insert including an under side, an opposite upper side, and a circumferential edge side connecting the upper side and the underside, and each flank insert defining a centre axis that extends through the upper side and underside of the flank insert, wherein the edge side of the flank insert forms a rake face.

2. The milling tool according to claim 1, wherein the edge side comprises a plurality of edge side sections that form a respective rake face and a respective flank insert edge together with the upper side.

3. The milling tool according to claim 1, wherein a distance between the upper side and the underside of each flank insert is shorter than a shortest length of the upper side of the flank insert along a direction that intersects the centre axis.

4. The milling tool according to claim 1, wherein each flank insert has a fastening hole that extends through the upper side and the underside.

5. The milling tool according to claim 4, wherein each flank insert is attached in a respective flank insert seat by means of a fixing screw that extends through the fastening hole into the tool body and that presses the flank insert against the flank insert seat by a press force.

6. The milling tool according to claim 5, wherein the fixing screw extends in an attachment direction having an axial component that is considerably greater than other direction components of the attachment direction.

7. The milling tool according to claim 5, wherein the fixing screw presses the underside of the flank insert against the bottom surface by a principal force component of said press force and one of the edge side sections against the outer side surface by a first smaller force component of said press force.

8. The milling tool according to claim 7, wherein the fixing screw also presses another edge side section of the flank insert against the inner side surface by a second smaller force component of said press force.

9. The milling tool according to claim 8, wherein the second smaller force component is smaller than the first smaller force component.

10. The milling tool according claim 1, wherein the primary main cutting edge of the root insert and the flank insert edge of the flank insert in said second seat extend in a projection along a respective common line, which comprise sections intersecting or overlapping each other, and wherein the secondary main cutting edge of the root insert and the flank insert edge of the flank insert in said third seat extend in another projection along another respective common line, which comprise sections intersecting or overlapping each other.

11. The milling tool according to claim 1, wherein the root inserts and different flank inserts are arranged in an alternating order along the circumferential direction.

12. The milling tool according to claim 11, wherein the alternating order is such that one of the root inserts is followed by a flank insert on one of the primary sides and the secondary sides and this is in turn followed by a flank insert on the other one of the primary sides and the secondary sides.

13. The milling tool according to claim 11, wherein the alternating order is such that one of the root inserts is followed by a flank insert on one of the primary sides and the secondary sides, which in turn is followed by a root insert that then is followed by a flank insert on the other one of the primary sides and the secondary sides.

14. The milling tool according to claim 1, wherein the rake face of the root insert extends in an extension plane comprising the primary main cutting edge and the secondary main cutting edge, and wherein the extension plane of each root insert has a normal that is parallel to a tangent of the first line where the same intersects the extension plane.

15. The milling tool according to claim 1, wherein each root insert includes a symmetry line that is perpendicular to a tangent of the first line, and wherein the primary main cutting edge and the secondary main cutting edge are symmetrical with respect to the symmetry line.

16. A set of milling inserts of a milling tool for slot milling, comprising:
   at least one root insert, said at least one root insert including an underside, an opposite upper side that forms a rake face, a circumferential edge side connecting the upper side and the underside, and at least one primary main cutting edge and secondary main cutting edge, which converge toward each other and are formed where the edge side meets the upper side: and
   at least one flank insert, said at least one flank insert including an underside, an opposite upper side, and a circumferential edge side connecting the upper side and the underside, said at least one flank insert defining a centre axis that extends through the upper side and underside of the at least one flank insert wherein, the edge side of the at least one flank insert forms a rake face.

17. The set according to claim 16, wherein each at least one root insert includes a transverse end cutting edge that extends between the primary main cutting edge and the secondary main cutting edge.

18. The set according to claim 16, wherein the rake face of the at least one root insert extends in an extension plane comprising the primary main cutting edge and the secondary main cutting edge, and wherein a normal to the extension plane forms an acute clearance angle with the edge side at least in the vicinity of said cutting edges of the at least one root insert so that the at least one root insert has a positive cutting geometry.

* * * * *

UNITED STATES PATENT AND TRADEMARK OFFICE
CERTIFICATE OF CORRECTION

PATENT NO. : 8,961,075 B2  
APPLICATION NO. : 13/872273  
DATED : February 24, 2015  
INVENTOR(S) : Thomas Sågström Page 1 of 1

It is certified that error appears in the above-identified patent and that said Letters Patent is hereby corrected as shown below:

On the title page item (73), should read  
Assignee: Sandvik Intellectual Property AB Signed and Sealed this  
Twenty-seventh Day of October, 2015

Michelle K. Lee  
*Director of the United States Patent and Trademark Office*